US009100900B2

(12) United States Patent
Edara et al.

(10) Patent No.: US 9,100,900 B2
(45) Date of Patent: Aug. 4, 2015

(54) HOME OR HIGHER PRIORITY PLMN SCAN IN 4G CONNECTED MODE

(75) Inventors: Kiran K. Edara, Cupertino, CA (US); Pratima Vallurupalli, San Jose, CA (US)

(73) Assignee: Amazon Technologies, Inc., Reno, NV (US)

(*) Notice: Subject to any disclaimer, the term of this patent is extended or adjusted under 35 U.S.C. 154(b) by 524 days.

(21) Appl. No.: 13/211,216

(22) Filed: Aug. 16, 2011

(65) Prior Publication Data
US 2013/0044660 A1 Feb. 21, 2013

(51) Int. Cl.
*H04W 48/16* (2009.01)
*H04W 76/04* (2009.01)

(52) U.S. Cl.
CPC ............ *H04W 48/16* (2013.01); *H04W 76/048* (2013.01)

(58) Field of Classification Search
CPC ............................ H04W 48/16; H04W 76/048
USPC ................ 370/329, 311; 455/434, 432.1, 436
See application file for complete search history.

(56) References Cited

U.S. PATENT DOCUMENTS

| | | | |
|---|---|---|---|
| 7,167,707 B1* | 1/2007 | Gazzard et al. ............... 455/434 |
| 2007/0207841 A1* | 9/2007 | Amerga et al. ............... 455/574 |
| 2008/0108346 A1* | 5/2008 | Umatt et al. ............... 455/432.1 |
| 2009/0239533 A1* | 9/2009 | Somasundaram et al. .... 455/434 |
| 2012/0113905 A1* | 5/2012 | Anderson et al. ............. 370/329 |
| 2012/0190364 A1* | 7/2012 | Wu ............................... 455/436 |
| 2013/0272153 A1* | 10/2013 | Kazmi et al. .................. 370/252 |

* cited by examiner

*Primary Examiner* — Man Phan
*Assistant Examiner* — Mandish Randhawa
(74) *Attorney, Agent, or Firm* — Lowenstein Sandler LLP (57) ABSTRACT

Methods and systems facilitating a preferred network scan in a 4G communications system are disclosed. A user device identifies a new search event when operating in connected state. The user device transitions to idle state, performs a preferred network scan, and returns to connected state.

21 Claims, 9 Drawing Sheets

FIG. 1A

DRX mode – no PLMN scan

DRX mode – with PLMN scan

HOME OR HIGHER PRIORITY PLMN SCAN IN 4G CONNECTED MODE

BACKGROUND

In today's wireless communication networks, Public Land Mobile Networks (PLMNs) have been established to provide land mobile telecommunications service to user devices such as electronic book readers, cellular telephones, personal digital assistants (PDAs), portable media players, tablet computers, netbooks, and the like. Generally, each service provider operates its own PLMN. A user device typically attempts to register with its own service provider's PLMN (the home PLMN) upon initial power up. If the user device is located outside of the area covered by the home PLMN, the user device attempts service acquisition on another PLMN, which is commonly known as roaming. Typically, a prioritized list of PLMNs that the user device is allowed to access is stored on a Subscriber Identity Module (SIM) card. The entries and prioritization in the list are usually based on agreements contracted among the various service providers.

When a user device is camped on a PLMN that is not its home PLMN or the highest priority PLMN, the user device usually performs a PLMN scan trying to find its home PLMN or a higher priority PLMN. A PLMN scan is repeated at predetermined time intervals, as defined in a standard specification, such as the 3rd Generation Partnership Project (3GPP) specification. For example, the 3GGP specification requires that a PLMN scan be performed every (6*n) minutes, where "n" is configurable by a service provider and is often set to 1, resulting in a PLMN scan being performed every 6 minutes.

The PLMN scan procedure requires a user device receiver to be programmed to different frequencies in order to perform power measurements on various frequencies. Hence, in current wireless technology standards supporting second generation (2G) communication systems (e.g., Global Systems for Mobile Communications (GSM)) and third generation (3G) communication systems (e.g., Universal Mobile Telecommunications Systems (UMTS)), periodic PLMN scans are not performed by a user device when the user device is in connected state (i.e., when the user device's receiver is always busy listening to a serving cell). Rather, periodic PLMN scans are performed only when the user device is in idle state (i.e., when the user device has no active radio bearer connection with the network). Often, when the user device is in idle state, the network configures the user device to a discontinuous reception (DRX) mode where the user device wakes up for decoding pages at fixed intervals specified by the network to save power consumption. The user device then usually performs periodic PLMN scans between these DRX wakeups.

In current 2G and 3G systems, user devices are left in idle state most of the time unless they have to send data or make a voice call. This approach provides battery saving benefits but results in longer connection times because a user device needs to establish a radio bearer every time it needs to move from idle to connected state. 3GPP Long Term Evaluation (LTE), the latest wireless technology standard developed to support fourth generation (4G) communication systems, addresses this problem by introducing the DRX concept in connected state and keeping user devices in connected state most of the time to shorten connection times. This, however, makes it difficult for a user device to perform a home or higher priority PLMN scan when the user device is connected to a roaming network.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for facilitating preferred network scans performed by user devices operating in a fourth generation (4G) communications system are described. A user device may be any mobile or content rendering device. Examples of such user devices include electronic book readers, cellular telephones, personal digital assistants (PDAs), portable media players, tablet computers, netbooks, and the like. A user device may connect to a network to participate in a voice over IP (VoIP) call, obtain content from a server or perform other activity.

In one embodiment, a user device operating in connected state in a 4 G communications system identifies a new search event and determines whether the user device is in a discontinuous reception (DRX) mode. If so, the user device determines whether its current DRX wakeup interval exceeds a threshold. If the DRX wakeup interval of the user device does exceed a threshold, the user device performs a preferred network scan. If the DRX wakeup interval of the user device does not exceed a threshold, the user device requests a DRX wakeup interval greater than the threshold from a server, and when the server configures the user device to a DRX wakeup interval greater than the threshold, the user device performs a preferred network scan.

In one embodiment, if the user device is not in DRX mode, the user device requests the server to configure the user device to DRX mode with a DRX wakeup interval greater than the threshold. If the server satisfies the user device request, the user device performs a preferred network scan. If the server does not satisfy the user device request, then the user device transitions to idle state, performs a preferred network scan, and then returns to connected state.

Accordingly, an efficient mechanism is provided to allow a user device to perform a preferred network scan while being in connected state. As a result, a user device can be left in connected state most of the time and still be able to perform preferred network scans when connected to (camped on) a roaming network.

Figure 1A:
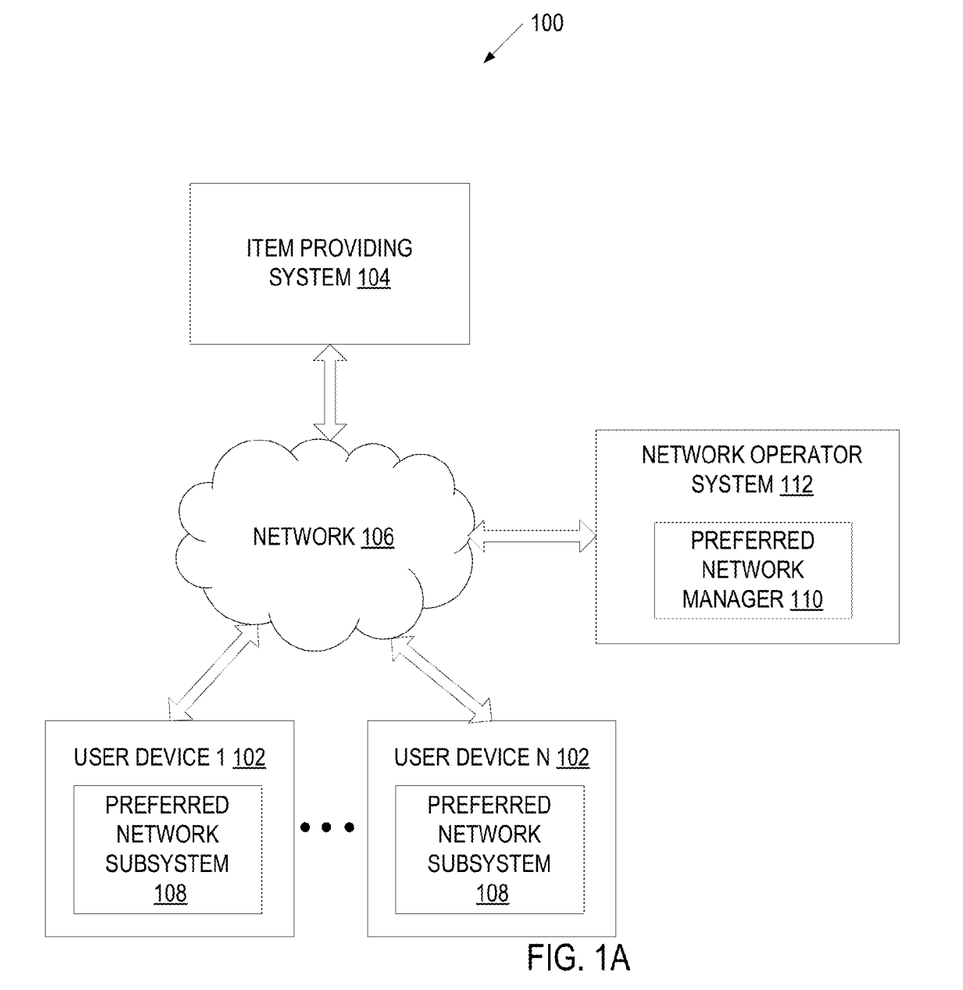
FIG. 1A is a block diagram of an exemplary network architecture in which embodiments of the invention may operate.

FIG. 1A is a block diagram of exemplary network architecture 100 in which embodiments of the invention may operate. The network architecture 100 may include an item providing system 104 and multiple user devices 102 coupled to the item providing system 104 via a network 106 (e.g., public network such as the Internet or private network such as a local area network (LAN)).

The user devices 102 are variously configured with different functionality to enable voice communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates. The user devices 102 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 104 may be a content provider server or any other server that provides various services to user devices 102 via the network 106. In one embodiment, the item providing system 104 downloads data items (such as content items, upgrades, and/or other similar items) to the user devices 102 via the network 106. The item providing system 104 also receives various requests and instructions pertaining to the data items from the user devices 102 via the network 106. The item providing system 104 may include one or more machines (e.g., one or more server computer systems, routers, gateways) that have processing and storage capabilities to provide the above functionality.

Communication between the item providing system 104 and a user device 102 may be enabled via any communication infrastructure. One example of such an infrastructure includes a combination of a wide area network (WAN) or a VPN and wireless infrastructure, which allows a user to use the user device 102 to purchase items and consume items without being tethered to the item providing system 104 via hardwired links. The wireless infrastructure is provided by a network operator (service provider) system 112 that can be implemented using various data processing equipment, communication towers, etc. Alternatively, or in addition, the network operator system 112 may rely on satellite technology to exchange information with the user device 102. Yet alternatively, or in combination, the network operator system 112 may represent an access point (e.g., WiFi access point) provider system. The network operator 112 may include one or more servers (e.g., one or more server computer systems, routers, gateways) that have processing and storage capabilities to provide the above functionality.

The communication infrastructure may also include a communication-enabling system that serves as an intermediary in passing information between the item providing system 104 and the wireless network operator system 112. The communication-enabling system may communicate with the wireless network operator via a dedicated channel, and may communicate with the item providing system 104 via a non-dedicated communication mechanism, e.g., a public network such as the Internet.

The item providing system 104 may pay the network operator a fee based on the aggregate use of the network operator system by all of the user devices 102. The item providing system 104 may recoup these costs through fees charged to the end-users separately or as part of other purchases (e.g., purchase of digital content) made by the end-users. Alternatively, the network operator may submit bills directly to individual users, or may submits bills to either the item providing system 104 (in aggregate) or to the individual users, at the option of the individual respective users.

A user device 102 may be associated with a specific network operator (service provider) 112 by means of a subscriber identity module (SIM) card. A SIM card may include predefined lists of preferred wireless networks (e.g., PLMNs) that a user device 102 should use when acquiring service outside of the area covered by its own network operator. Alternatively, a user device 102 may be associated with a specific network operator based on data stored in memory (e.g., non-volatile memory), and predefined lists of preferred wireless networks (e.g., PLMNs) may also be stored in memory of the user device. When a user device 102 is connected to (camped on) a PLMN that is not its home PLMN or the highest priority PLMN, the user device performs a PLMN scan trying to find its home PLMN or a higher priority PLMN. A PLMN scan is repeated at predetermined time intervals, as defined in a standard specification. For example, the 3GGP specification requires that a PLMN scan be performed every (6*n) minutes, where "n" is configurable by a service provider (e.g., in the SIM card).

In wireless technology standards supporting 2G and 3 G communication systems (e.g., GSM and UMTS), a user device having a single receiver for a distinct radio access technology (e.g., WiFi or GSM) performs periodic PLMN scans only when the user device is in idle state and often when the user device is configured to a DRX mode. As will be discussed in more detail below, in DRX mode, a user device may wake up for decoding pages at fixed intervals and performs periodic PLMN scans between these wakeups. In 2G and 3G systems, user devices are left in idle state most of the time unless they have to send data or make a streaming voice call (e.g., a voice over IP call). In wireless technology standards supporting 4 G communications systems such as 3GPP Long Term Evaluation (LTE) and Worldwide Interoperability for Microwave Access (WiMAX), user devices are kept in connected state most of the time to shorten connection times and network operators can configure user devices to DRX mode while they are in connected state to reduce power consumption.

Figure 1B:
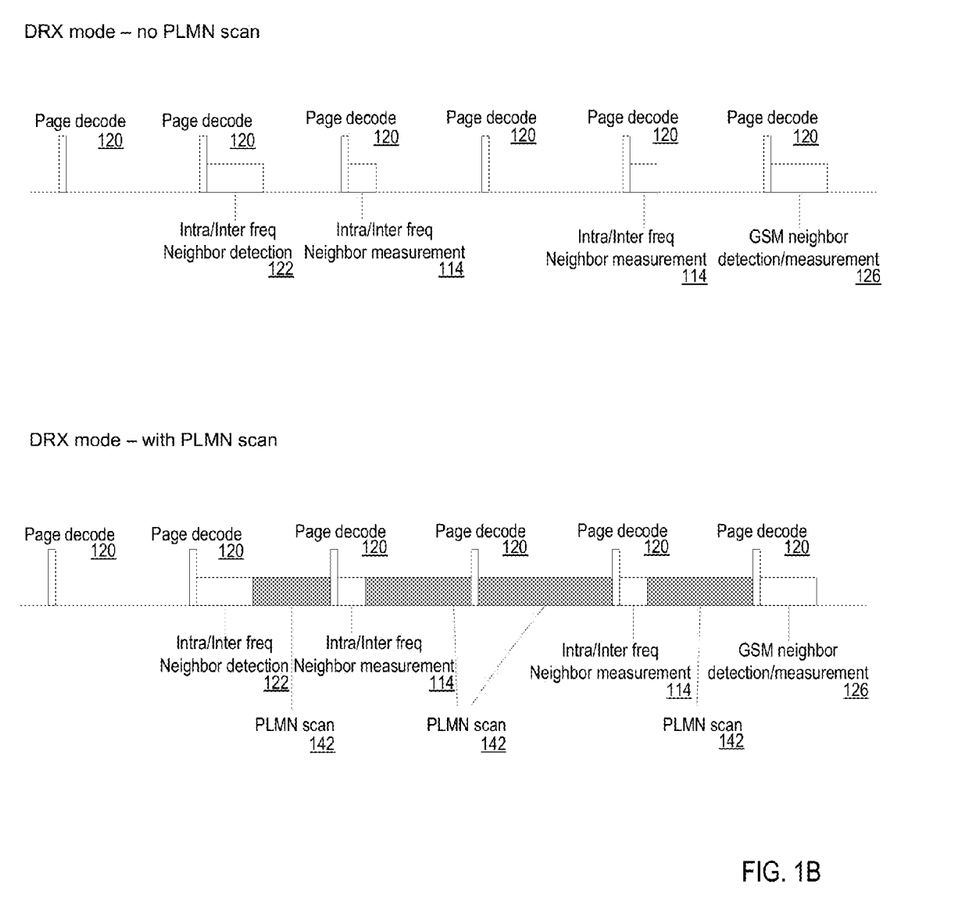
FIG. 1B illustrates the operation of a user device in DRX mode in accordance with some embodiments of the invention.

FIG. 1B illustrates the operation of a user device in DRX mode in accordance with some embodiments of the invention. When in DRX mode, a network configures a user device to stay in sleep mode (refrain from receiving and transmitting communications) and wake up only at predefined time intervals. In the beginning of a wakeup interval, a network may send a page for the user device, which the user device will need to decode (operation 120). In addition, the user device may perform other operations during the wakeup intervals. For example, the user device may scan its current network to detect neighboring cells on certain intra and inter frequencies (operation 122). If the user device detects a neighboring cell during a wakeup interval, the user device may perform measurements (e.g., signal strength) during the next wakeup interval (operation 114). In addition, the user device may scan other networks (e.g., GSM network) to detect cells and perform measurements for the detected cells (operation 126). Once the user device is done with its activity, it goes back to sleep.

When the user device is connected to a roaming network and configured to a DRX mode, the user device may perform a PLMN scan during a wakeup interval (operation 142). However, the user device may not be able to complete the PLMN scan during a single wakeup interval. Rather, the user device may scan a specific frequency and networks associated with this frequency and then stop the PLMN scan to decode a page sent for the user device. During the next wakeup interval, the user device may continue the PLMN scan using a different frequency, and so on.

As discussed above, when user devices are configured to DRX mode in idle state, DRX wakeup intervals are typically large enough to allow a user device to complete measurements on a given frequency. In some 3G and 4G systems, user devices may also be configured to DRX mode in connected state using shorter wakeup intervals that are often not large enough to allow a user device to complete power measurements for PLMN scan on a given frequency.

Embodiments of the invention optimize the operation of user devices 102 in a 4G communications system by enabling user devices 102 to perform a home or higher priority PLMN scan when user devices 102 are in connected state and are camped on a roaming network. In one embodiment, each user device 102 hosts a preferred network subsystem 108 that facilitates home or higher priority PLMN scans during DRX wakeup intervals in connected state. In particular, the preferred network subsystem 108 may determine that the user device 102 is in DRX mode and identify its current DRX wakeup interval. For example, according to the 3GPP specification, a network operator can configure a user device in LTE connected state to a long DRX wakeup interval of 5 ms, 10 ms, 16 ms, 20 ms, 32 ms, 40 ms, 64 ms, 80 ms, 128 ms, 160 ms, 256 ms, 320 ms, 512 ms, 640 ms, 1024 ms, or 1280 ms; or to a short DRX wakeup interval of 1 ms, 2.5 ms, 4 ms, 5 ms, 8 ms, 10 ms, 16 ms, 20 ms, 32 ms, 40 ms, 64 ms, 80 ms, 128 ms, 160 ms, 256 ms, or 320 ms. The preferred network subsystem 108 determines whether a current DRX wakeup interval of the user device 102 exceeds a threshold, and if so, the preferred network subsystem 108 causes a home or higher priority PLMN scan to be performed during a DRX wakeup interval in connected state. The threshold may correspond to the minimum time needed to perform a successful power measurement on a given frequency. For example, the threshold can be set to 80 ms, which is the minimum DRX wakeup interval needed to perform a successful power measurement on a given UMTS frequency. This minimum DRX wakeup interval can further take into account other operations (e.g., page decoding, neighbor cell detection and measurements) that the user device may need to perform between the DRX wakeups, in addition to power measurement on a given frequency. Alternatively, the threshold may correspond to the minimum time needed to perform a home or higher priority PLMN scan.

In one embodiment, if the DRX wakeup interval of the user device 102 does not exceed a threshold, the preferred network subsystem 108 requests a DRX wakeup interval greater than the threshold from the network operator system 112. In one embodiment, the network operator system 112 hosts a preferred network manager 110 that receives a user device request and configures the user device 102 to a DRX wakeup interval that exceeds the threshold. The preferred network subsystem 108 of the user device 102 then causes a home or higher priority PLMN scan to be performed during a DRX wakeup interval in connected state. In one embodiment, if the network operator system 112 does not reconfigure the user device 102 to a DRX wakeup interval that exceeds the threshold, the preferred network subsystem 108 causes the user device 102 to transition to idle state (e.g., based on the current ongoing user activities in connected state such as a VoIP call, an active browser session, etc.), perform a home or higher PLMN scan and then return to connected state.

Figure 2:
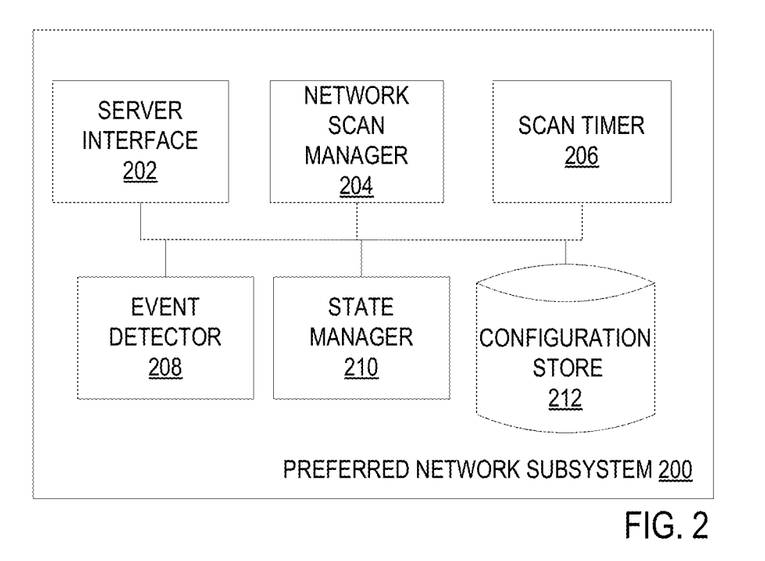
FIG. 2 is a block diagram of one embodiment of a preferred network subsystem.

FIG. 2 is a block diagram of one embodiment of a preferred network subsystem 200 hosted by a user device. The preferred network subsystem 200 may be the same as preferred network subsystem 108 of FIG. 1 and may include a server interface 202, a network scan manager 204, a scan timer 206, an event detector 208, a state manager 210 and configuration store 212. The components of the preferred network subsystem 200 may represent modules that can be combined together or separated into further modules, according to some embodiments.

The user device typically includes a SIM card that associates the user device with a specific network operator and stores predefined lists of preferred networks that the user device should use when performing a preferred network scan on a network that is not its home network or the highest priority network. The SIM card may also store a configuration parameter that defines the rate of preferred network scans. For example, the 3GPP specification requires a preferred network scan to be performed every 6*n minutes, where "6" is the constant and "n" is a configurable parameter that can be stored on the SIM card by the network operator. Alternatively, data associating the user device with a specific network operator, preferred network lists and a scan rate parameter may be stored in non-volatile memory of the user device.

The event detector 208 is responsible for detecting a new search event. A new search event may be triggered by the scan timer 206. In particular, the scan timer 206 may be set to a predefined scan rate parameter (e.g., 6*n) when the user device is camped on a network that is not its home network or the highest priority network. The event detector 208 may detect a new search event every time the scan timer 206 expires or after the scan timer 206 has expired a predefined number of times (e.g., 2 or 3 times). In some embodiments, a new search event may be initiated by a user or automatically by a remote server.

When the event detector 208 detects a new search event, it invokes the network scan manager 204 that checks whether the user device is involved in any streaming voice call (e.g., a voice over IP call) or any active data operation. An active data operation refers to exchange of data items (e.g., content items or upgrades) and exchange of requests or instructions pertaining to the exchange of data items (e.g., a request for a content item or an instruction to download an upgrade at a specific time) between the user device and a server (e.g., an ongoing data session with the item providing system 104) or another user device. If the user device is involved in any active voice or data operation, the network scan manager 204 may repeat this check at predefined time intervals (e.g., every 20 seconds) until the user device is no longer involved in any streaming voice call and any active data operation. The network scan manager 204 may then determine whether the user device is in DRX mode and if so, identify its current DRX wakeup interval. In one embodiment, the network scan manager 204 can make this determination using the configuration store 212 that stores current user device configuration parameters provided by a server of the network operator. The configuration store 212 may represent a single data structure or multiple data structures (tables, databases, repositories, files, etc.) residing on one or more mass storage devices, such as magnetic or optical storage based disks, solid-state drives or hard drives.

If the current DRX wakeup interval of the user device exceeds a threshold, the network scan manager 204 performs a preferred network scan (e.g., a home or higher priority PLMN scan) during a DRX wakeup interval in connected state. The threshold may correspond to the minimum time needed to perform a successful power measurement on a given frequency.

If the current DRX wakeup interval of the user device does not exceed a threshold, the network scan manager 204 invokes the server interface 202 to request a DRX wakeup interval greater than the threshold from the server of the network operator. If the network operator configures the user device to a DRX wakeup interval greater than the threshold, the network scan manager 204 performs a preferred network scan during a DRX wakeup interval in connected state. In one embodiment, when the network scan manager 204 completes the preferred network scan, the server interface 202 may notify the network operator server that it no longer needs the larger DRX wakeup interval. The server interface 202 may then wait for the network operator server to reconfigure it to a shorter DRX wakeup interval or the network scan manager 204 may automatically go back to the DRX interval the user device had before the last DRX interval configuration.

If the network operator does not configure the user device to a DRX wakeup interval that exceeds the threshold, the state manager 210 transitions the user device from connected state to idle state, and invokes the network scan manager 204 to perform a preferred network scan. When the preferred network scan is completed, the state manager transitions the user device from idle state back to connected state (e.g., by performing a radio resource control (RRC) re-establishment procedure).

Figure 3:
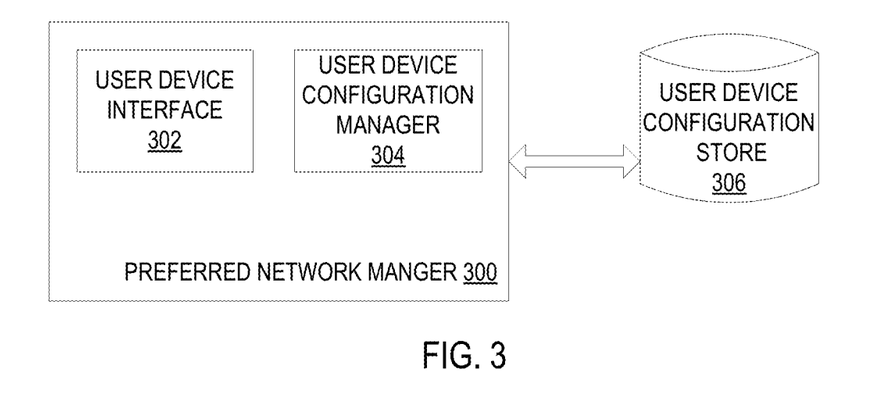
FIG. 3 is a block diagram of one embodiment of a preferred network manager.

FIG. 3 is a block diagram of one embodiment of a preferred network manager 300 hosted by a network operator server. The preferred network manager 300 may be the same as preferred network manager 110 of FIG. 1. The preferred network manager 300 may include a user device interface 302, a user device configuration manager 304, and a user device configuration store 306. The components of the preferred network manager 300 may represent modules that can be combined together or separated into further modules, according to some embodiments.

The user device interface 302 receives configuration requests from various user devices. A configuration request may identify a user device and ask for a DRX wakeup interval greater than a threshold. The configuration request may specify a threshold value. Alternatively, a threshold value may be stored in the user device configuration store 306 and may be the same for all user devices or different depending on the type of user device.

Upon receiving a configuration request from a user device, the user device configuration manager 304 may determine whether the user device is in DRX mode using the user device configuration store 306. If so, the user device configuration manager 304 may reconfigure the current DRX wakeup interval to a higher value in the user device configuration store 306, and may invoke the user device interface 302 to send a corresponding configuration message to the user device. If the user device is not in DRX mode, the user device configuration manager 304 may reconfigure the user device to DRX mode and a DRX wakeup interval higher than the threshold in the user device configuration store 306, and may invoke the user device interface 302 to send a corresponding configuration message to the user device. The user device configuration store 306 may represent a single data structure or multiple data structures (tables, databases, repositories, files, etc.) residing on one or more mass storage devices, such as magnetic or optical storage based disks, solid-state drives or hard drives.

Figure 4:
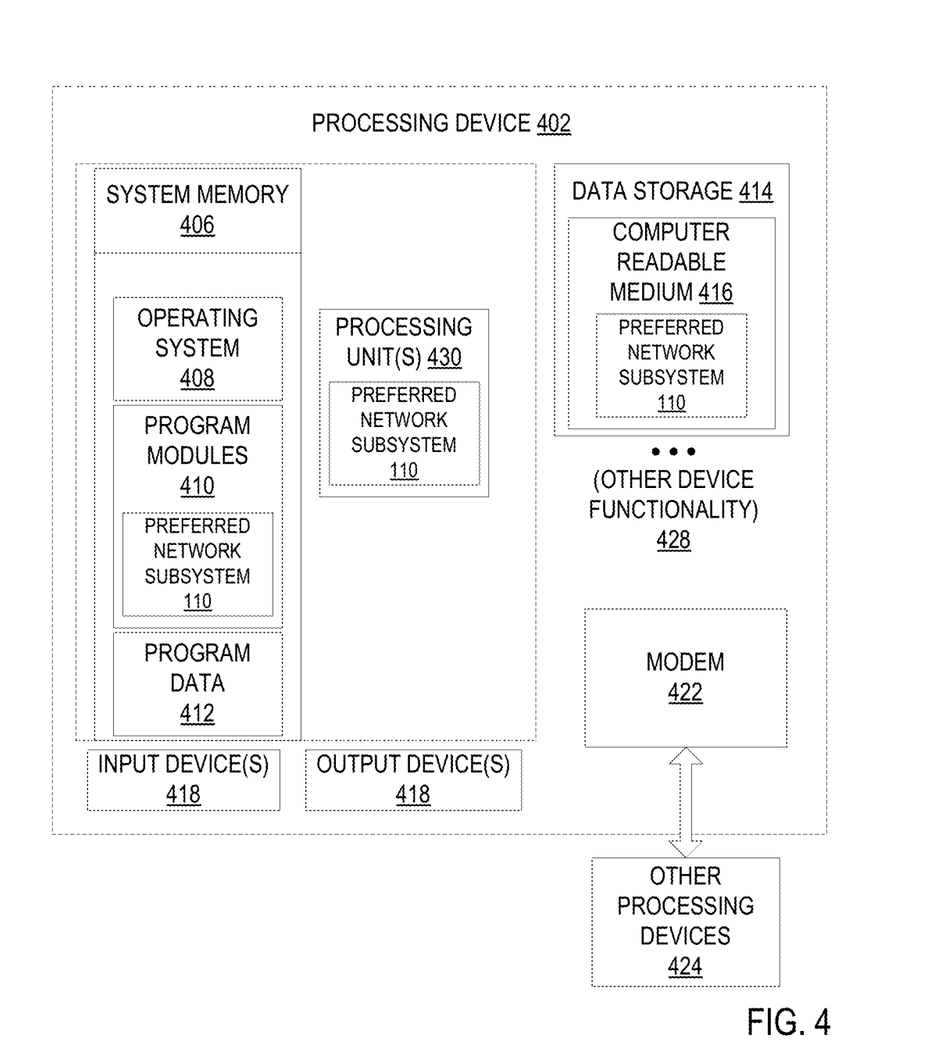
FIG. 4 is a block diagram illustrating an exemplary user device.

FIG. 4 is a block diagram illustrating an exemplary user device 400. The user device 400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 400 includes one or more processing units 430, such as one or more CPUs. The user device 400 also includes system memory 406, which may correspond to any combination of volatile and/or non-volatile storage mechanisms. The system memory 406 may store information which provides an operating system component 408, various program modules 410 including preferred network subsystem 108, program data 412, and/or other components. The user device 400 performs functions by using the processing unit(s) 430 to execute the preferred network subsystem 108 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the preferred network subsystem 108) embodying any one or more of the methodologies or functions described herein. As shown, instructions of the preferred network subsystem 108 may also reside, completely or at least partially, within the system memory 406 and/or within the processing unit(s) 430 during execution thereof by the user device 400, the system memory 406 and the processing unit(s) 430 also constituting computer-readable media. The instructions of the preferred network subsystem 108 may further be transmitted or received over a network.

The user device 400 may also include one or more input devices 418 (keyboard, mouse device, specialized selection keys, etc.) and one or more output devices 420 (displays, printers, audio output mechanisms, etc.). The user device 400 may further include a wireless modem 422 to allow the user device 400 to communicate via a wireless network with other computing devices 424, such as the network operator system, the item providing system, and so forth. The wireless modem 422 may allow the user device 400 to receive a voice call and also communicate with the item providing system in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, LTE and WiMax.

The above-enumerated list of modules is representative and is not exhaustive of the types of functions performed by the user device 400. As indicated by the label "Other Device Functionality" 428, the user device 400 may include additional functions.

Figure 5:
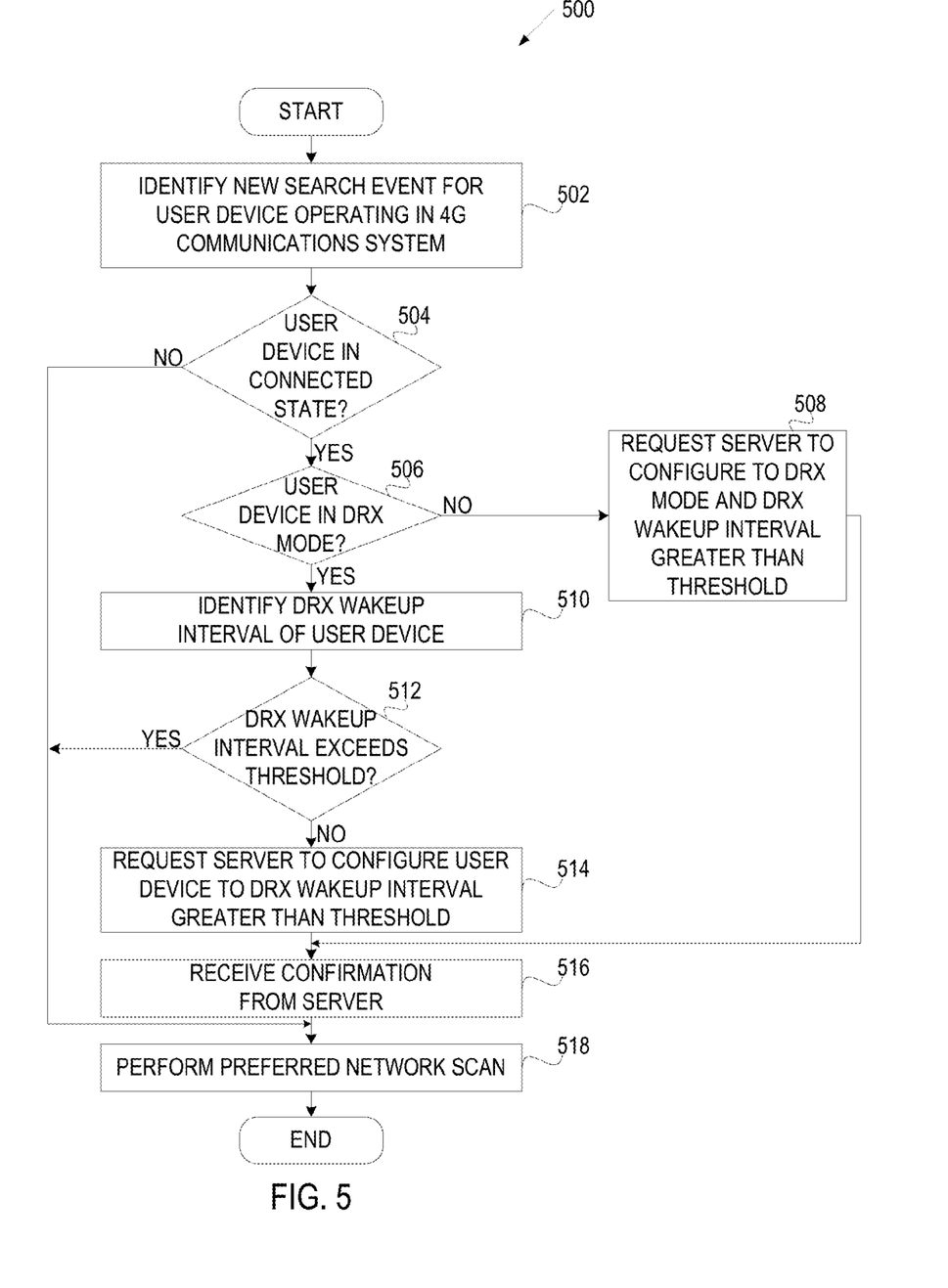
FIG. 5 is a flow diagram of one embodiment of a client-side method for facilitating preferred network scans in a 4 G communications system.
Figure 6:
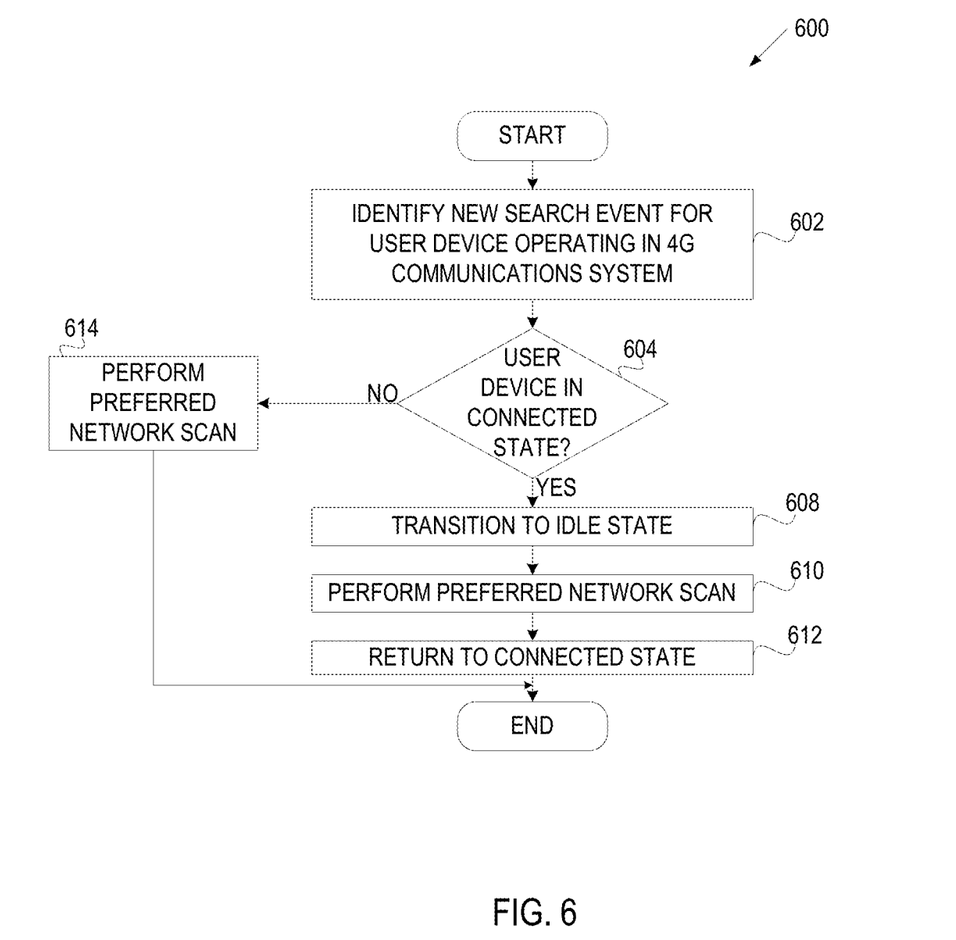
FIG. 6 is a flow diagram of another embodiment of a client-side method for facilitating preferred network scans in a 4 G communications system.
Figure 7:
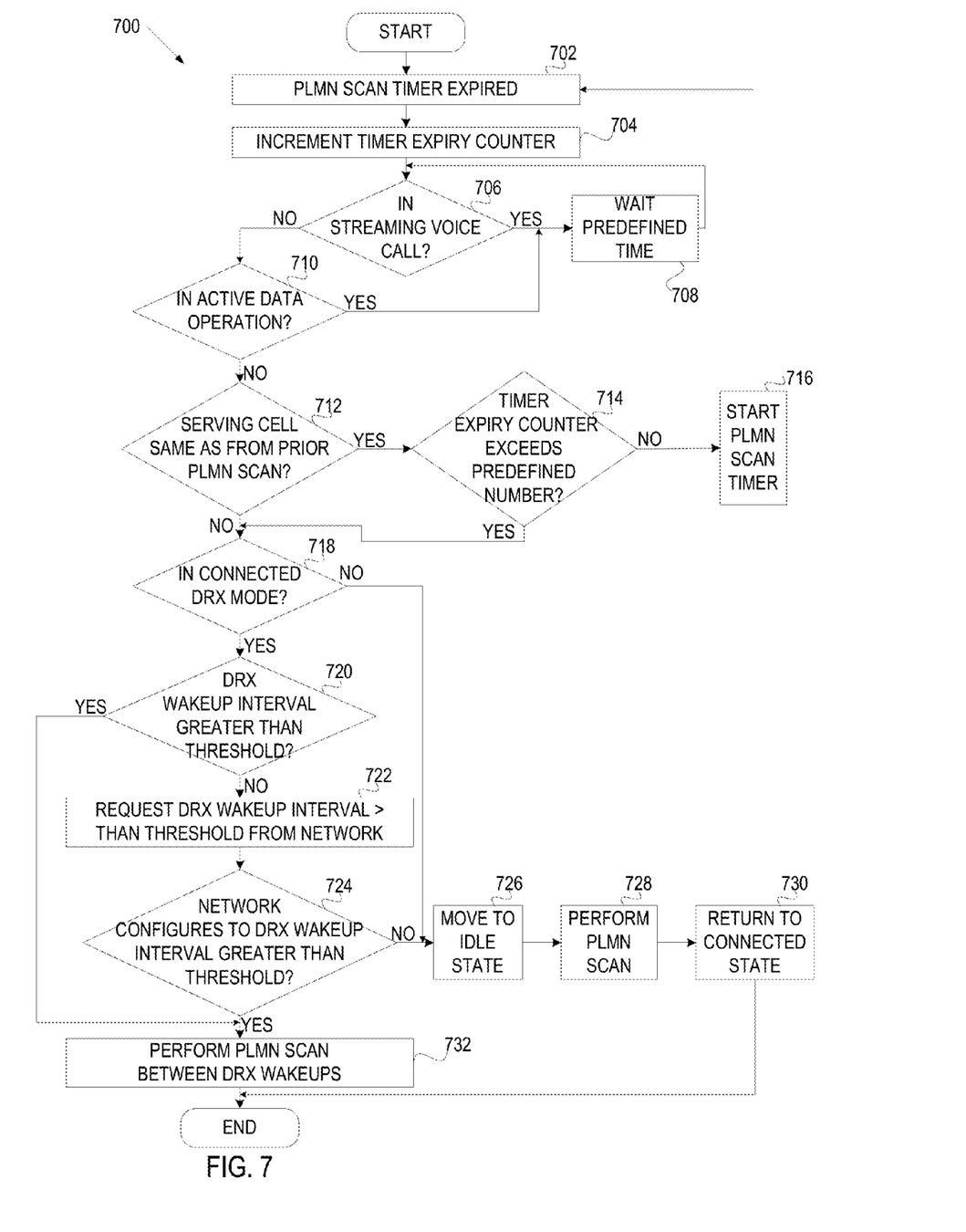
FIG. 7 is a flow diagram of yet another embodiment of a client-side method for facilitating preferred network scans in a 4 G communications system.

FIGS. 5, 6 and 7 are flow diagrams of various embodiments of client-side methods 500, 600 and 700 respectively for facilitating preferred network scans in a 4 G communications system. The methods are performed by processing logic that may comprise hardware (circuitry, dedicated logic, etc.), software (such as is run on a general purpose computer system or a dedicated machine), or a combination of both. Embodiments of the methods are performed by a user device (e.g., a preferred network subsystem 108 of user device 102 of FIG. 1).

Referring to FIG. 5, at block 502, a user device operating in a 4 G communications system (e.g., LTE communications system) identifies a new search event. A new search event may be identified at expiry of a preferred network scan timer or after a preferred network scan timer has expired a predefined number of times (e.g., 2 or 3 times).

At block 504, the user device determines whether it is in connected state (e.g., when a user device receiver is constantly listening to a serving cell). If not, it means that the user device is in idle state, and it can then perform a preferred network scan in accordance with a PLMN scan procedure (e.g., as defined by GSM or UMTS) (block 518).

If the user device is in connected state, then it further determines whether it is currently configured in DRX mode (block 506). If the user device is in DRX mode, the user device identifies its current DRX wakeup interval (block 510) and determines whether it exceeds a threshold (block 512). If so, the user device performs a preferred network scan during the next DRX wakeup interval (block 518). If not, the user device sends a request for a DRX wakeup interval greater than the threshold to a server (the server of the network operator) (block 514), waits for a confirmation from the server that it has reconfigured the user device accordingly (block 516), and performs a preferred network scan during the next DRX wakeup interval (block 518). If the user device is not in DRX mode, the user device requests the server to configure the user device to DRX mode and a DRX wakeup interval greater than the threshold (block 508), and method 500 proceeds to block 516.

In some embodiments, the user device requests a different DRX wakeup interval from the server for a reason other than a PLMN scan. For example, the user device may need a larger DRX wakeup interval if it has pending neighbor cell detection and measurements. Once the user device completes the activity requiring a larger DRX wakeup interval, the user device may reconfigure itself to a prior DRX wakeup interval or notify the server that it no longer requires the current DRX wakeup interval and wait for the server to reconfigure it to a different DRX wakeup interval.

Referring to FIG. 6, at block 602, a user device operating in a 4 G communications system (e.g., LTE communications system) identifies a new search event. A new search event may be identified at expiry of a preferred network scan timer or after the preferred network scan timer has expired a predefined number of times (e.g., 2 or 3 times).

At block 604, the user device determines whether it is in connected state (e.g., when a user device receiver is constantly listening to a serving cell). If not, it means that the user device is in idle state, and it can then perform a preferred network scan in accordance with a PLMN scan procedure (e.g., as defined by GSM or UMTS) (block 614).

If the user device is in connected state, then it transitions from connected state to idle state (block 608), and performs a preferred network scan (block 610). When the preferred network scan is completed, the user device transition back to connected state (e.g., by performing an RRC re-establishment procedure) (block 612).

Referring to FIG. 7, at expiry of a PLMN timer of a user device (block 702), a timer expiry counter is incremented by 1 (block 704). At block 706, a determination is made as to whether the user device is currently involved in a streaming voice call (e.g., a voice over IP call). If not, a further determination is made as whether the user device is currently involved in an active data operation (e.g., an ongoing session with the item providing system) (block 710). If the determination at block 706 or block 708 is positive, method 700 waits a predefined time interval and returns to block 706.

If the user device is not currently involved in a streaming voice call or an active data operation pertaining to item exchange, the user device determines whether the current serving cell is the same as the serving cell where a prior PLMN scan was performed (block 712). If not, method 700 proceeds to block 712. If so, then it is less likely that a new PLMN scan would result in finding a home or higher priority PLMN. Hence, the user device may delay the new PLMN scan by waiting for another expiration of the PLMN scan timer. In particular, the user device determines whether the timer expiry counter has exceeded a predefined number (e.g., 2 or 3) (block 714). If so, method 714 proceeds to block 718. If not, the user device restarts the PLMN scan timer (block 716) and method 700 returns to block 702.

At block 718, the user device determines whether it is in connected DRX mode. If not, method 700 proceeds to block 726. If so, the user device determines whether its current DRX wakeup interval is greater than a threshold (block 720). If the current DRX wakeup interval is greater than the threshold, the user device performs a PLMN scan between DRX wakeups (block 732). If the current DRX wakeup interval is not greater than a threshold, the user device requests a network operator to configure it to a DRX wakeup interval greater than the threshold (block 722). If the network operator satisfies the user device request (block 724), the user device performs a PLMN scan between DRX wakeups (block 732). If the user device does not satisfy the user device request, method 700 proceeds to block 726.

At block 726, the user device transitions from connected state to idle state. At block 728, the user device performs a PLMN scan. After the PLMN scan is completed, the user device transitions back to connected state (e.g., by performing an RRC re-establishment procedure) (block 730).

Figure 8:
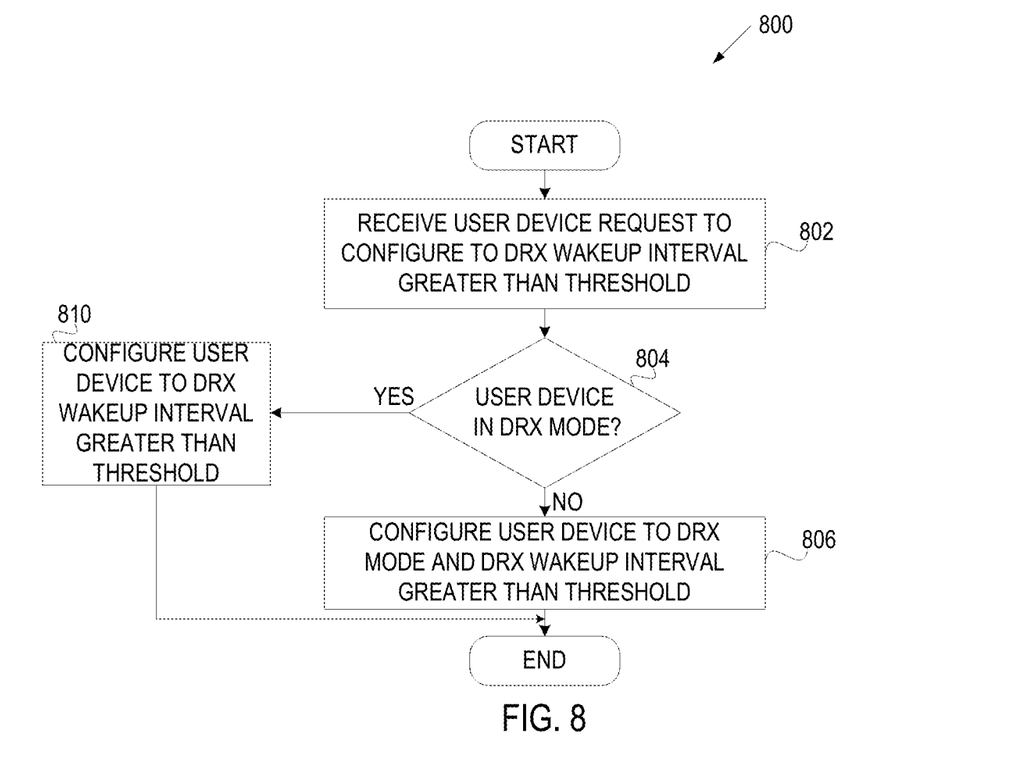
FIG. 8 is a flow diagram of one embodiment of a server-side method for facilitating preferred network scans in a 4 G communications system.

FIG. 8 is a flow diagram of one embodiment of a server-side method 800 for facilitating preferred network scans in a 4 G communications system. Method 800 is performed by processing logic that may comprise hardware (circuitry, dedicated logic, etc.), software (such as is run on a general purpose computer system or a dedicated machine), or a combination of both. In one embodiment, method 800 is performed by a server (e.g., a server of network operator system 112 of FIG. 1).

Method 800 begins with the server receiving a request to configure a use device to a DRX wakeup interval greater than a threshold (block 802). At block 804, the server determines whether the user device is in DRX mode. If so, the server configures the user device to a DRX wakeup interval greater than the threshold (block 810). If not, the server configures the user device to DRX mode and a DRX wakeup interval greater than the threshold (block 806).

Figure 9:
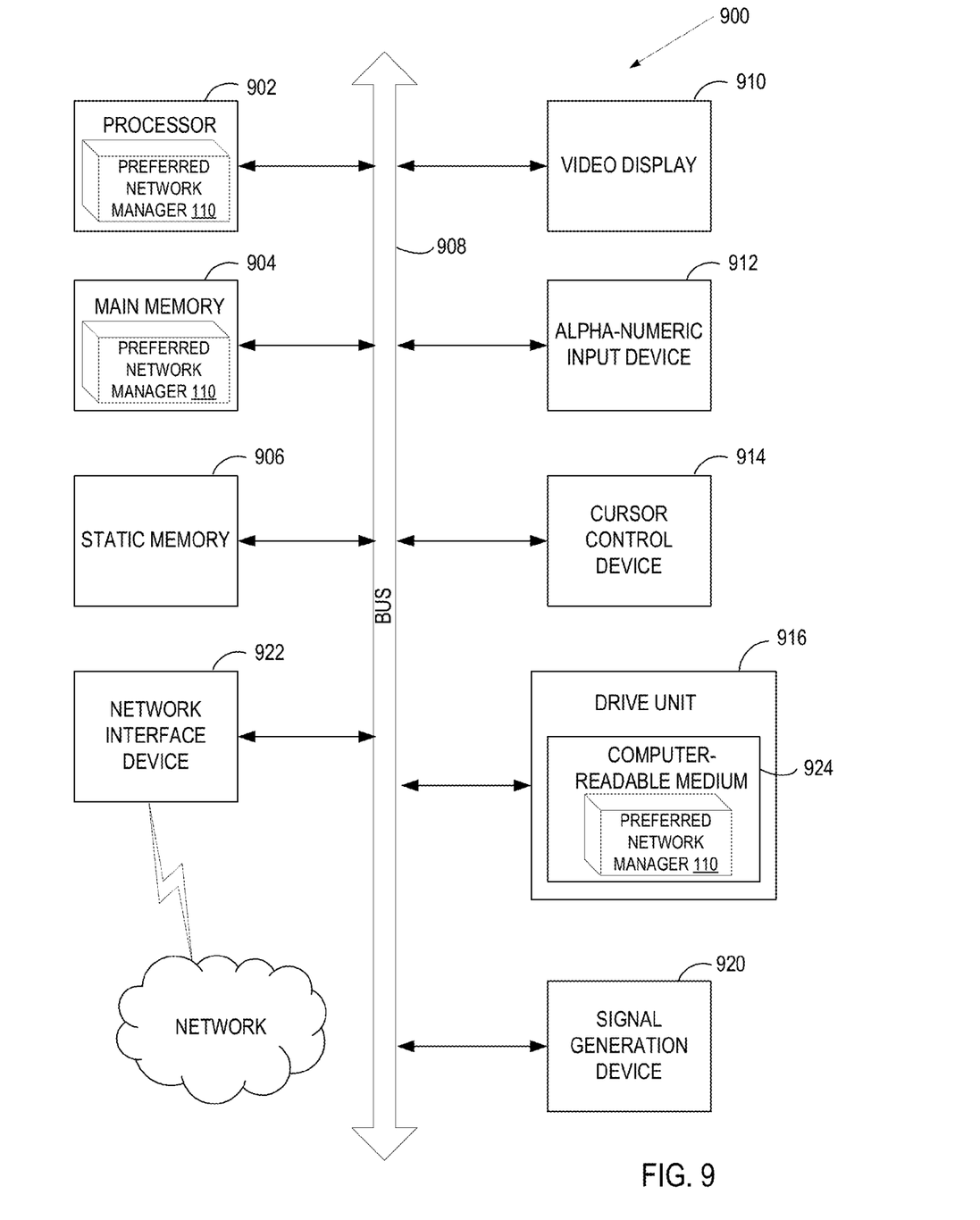
FIG. 9 illustrates an exemplary server assisting in preferred network scans.

FIG. 9 illustrates an exemplary server 900 that assists in preferred network scans. The server 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 906.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the preferred network manager 110 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable medium 924 on which is stored one or more sets of instructions (e.g., instructions of preferred network manager 110) embodying any one or more of the methodologies or functions described herein. The preferred network manager 110 may also reside, completely or at least partially, within the main memory 904 and/or within the processor 902 during execution thereof by the computer system 900, the main memory 904 and the processor 902 also constituting computer-readable media. The preferred network manager 110 may further be transmitted or received over a network 920 via the network interface device 922.

While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for a user device, comprising:
    identifying a new search event for the user device operating in a connected state in a fourth generation (4G) communications system;

determining whether the user device is in a discontinuous reception (DRX) mode;

responsive to determining that the user device is in the DRX mode, identifying a first DRX wakeup interval of the user device;

responsive to determining that the first DRX wakeup interval of the user device does not exceed a first threshold associated with a first frequency to be scanned during a first portion of a preferred network scan, requesting a second DRX wakeup interval greater than the first threshold from a server;

performing the first portion of the preferred network scan on the first frequency during an instance of the second DRX wakeup interval;

responsive to determining that the second DRX wakeup interval exceeds a second threshold associated with a second frequency to be scanned during a second portion of the preferred network scan, reconfiguring the user device back to the first DRX wakeup interval; and performing the second portion of the preferred network scan on the second frequency during an instance of the first DRX wakeup interval.

2. The method of claim 1, wherein the new search event is identified when a preferred network scan timer has expired.

3. The method of claim 1, wherein the first threshold comprises a minimum time needed to perform a successful power measurement on the first frequency.

4. The method of claim 1, wherein determining whether the user device is in the DRX mode is performed if a serving cell associated with the user device has changed since a previous preferred network scan or if a preferred network scan timer has expired a predefined number of times.

5. The method of claim 1, further comprising:
responsive to determining that the user device is not in the DRX mode, performing the following by the user device, comprising:
transitioning to an idle state;
performing the preferred network scan; and
returning to the connected state after completing the preferred network scan.

6. The method of claim 1, further comprising:
responsive to determining that the server has not configured the user device to the first DRX wakeup interval of the user device does not exceed greater than the first threshold, transitioning to an idle state, performing the first portion of the preferred network scan, and returning to the connected state.

7. A computer-implemented method for a user device, comprising:
identifying a first discontinuous reception (DRX) wakeup interval of a user device operating in a DRX mode in a connected state in a fourth generation (4G) communications system;
determining whether the first DRX wakeup interval exceeds a first threshold associated with a first frequency to be scanned during a first portion of a preferred network scan;
responsive to determining that the first DRX wakeup interval does not exceed the first threshold, requesting a second DRX wakeup interval that exceeds the first threshold from a server;
performing the first portion of the preferred network scan on the first frequency during an instance of the first DRX wakeup interval;
after determining that the second DRX wakeup interval exceeds a second threshold associated with a second frequency to be scanned during a second portion of the preferred network scan on the second frequency, reconfiguring the user device to a new DRX wakeup interval that is smaller than the second DRX wakeup interval; and performing the second portion of the preferred network scan on the second frequency during an instance of the new DRX wakeup interval.

8. The method of claim 7, further comprising: notifying the server that the user device no longer needs the second DRX wakeup interval; and receiving the new DRX wakeup interval.

9. The method of claim 7, wherein the new DRX wakeup interval corresponds to a previous DRX wakeup interval used by the user device.

10. The method of claim 7, further comprising identifying a new search event for the user device.

11. The method of claim 10, wherein identifying the new search event comprises:
detecting an expiration of a preferred network scan timer;
determining that a number of expirations of the preferred network scan timer since a last preferred network scan exceeds a predefined number; and
determining that the user device is not currently involved in any voice or data activity.

12. The method of claim 10, wherein the first threshold comprises a minimum time needed to perform a successful power measurement on the first frequency.

13. A non-transitory computer readable storage medium including instructions that, when executed by a processing system, cause the processing system to perform operations comprising:
identifying a new search event for a user device operating in a fourth generation (4G) communications system;
determining that the user device is in a connected state;
determining whether the user device is configured to a first discontinuous reception (DRX) wakeup interval that exceeds a first threshold associated with a first frequency to be scanned during a first portion of a preferred network scan;
responsive to determining that the user device is not configured to the first DRX wakeup interval that exceeds the first threshold, requesting a server to configure the user device to the first DRX wakeup interval that exceeds the first threshold;
performing the first portion of the preferred network scan on the first frequency during the first instance of the DRX wakeup interval;
responsive to determining that the first DRX wakeup interval exceeds a second threshold associated with a second frequency to be scanned during a second portion of the preferred network scan, requesting the server to configure the user device to a second DRX wakeup interval that is smaller than the first DRX wakeup interval; and
performing the second portion of the preferred network scan on the second frequency during an instance of the second DRX wakeup interval.

14. The non-transitory computer readable storage medium of claim 13, wherein identifying the new search event comprises:
detecting an expiration of a preferred network scan timer; and
determining that the user device is not currently involved in any voice or data activity.

15. The non-transitory computer readable storage medium of claim 13, wherein the first threshold comprises a minimum time needed to perform a successful power measurement on the first frequency.

16. The non-transitory computer readable storage medium of claim 13, wherein determining whether the user device is configured to the first DRX wakeup interval that exceeds the first threshold comprises:
    determining whether the user device is in the DRX mode; and
    responsive to determining that the user device is in the DRX mode, identifying a current DRX wakeup interval of the user device, and determining whether the current DRX wakeup interval of the user device is above the first threshold.

17. The non-transitory computer readable storage medium of claim 13, wherein the operations further comprise:
    notifying the server that the user device no longer needs the first DRX wakeup interval that exceeds the threshold; and
    receiving the second DRX wakeup interval from the server.

18. The non-transitory computer readable storage medium of claim 13, wherein the operations further comprise:
    reconfiguring the user device to the second DRX wakeup interval.

19. The non-transitory computer readable storage medium of claim 18, wherein the second DRX wakeup interval is a DRX wakeup interval that the user device had prior to a last configuration.

20. A system comprising:
    a memory;
    a processing device, coupled to the memory, the processing device to;
    identify a new search event for a user device operating in a connected state in a fourth generation (4G) communications system;
    determine whether the user device is in a discontinuous reception (DRX) mode;
    responsive to determining that the user device is in the DRX mode, identify a first DRX wakeup interval of the user device;
    responsive to determining that the first DRX wakeup interval of the user device does not exceed a first threshold associated with a first frequency to be scanned during a first portion of a preferred network scan, request a second DRX wakeup interval greater than the first threshold from a server;
    perform the first portion of the preferred network scan on the first frequency during an instance of the second DRX wakeup interval;
    responsive to determining that the second DRX wakeup interval exceeds a second threshold associated with a second frequency to be scanned during a second portion of the preferred network scan, reconfigure the user device back to the first DRX wakeup interval; and
    perform the second portion of the preferred network scan on the second frequency during an instance of the first DRX wakeup interval.

21. The system of claim 20, wherein the new search even is identified when a preferred network scan timer has expired.

* * * * *